Figure 1:
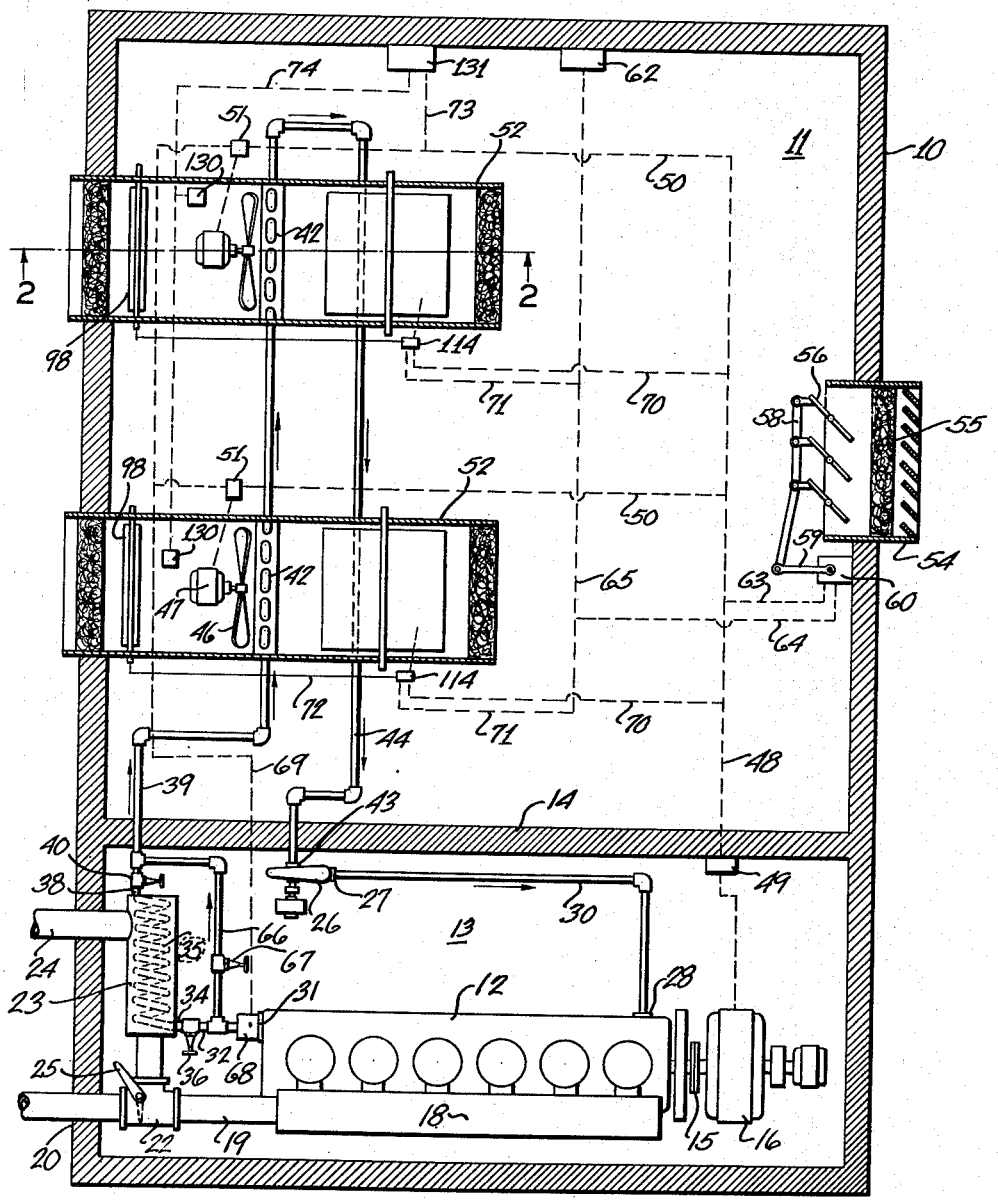

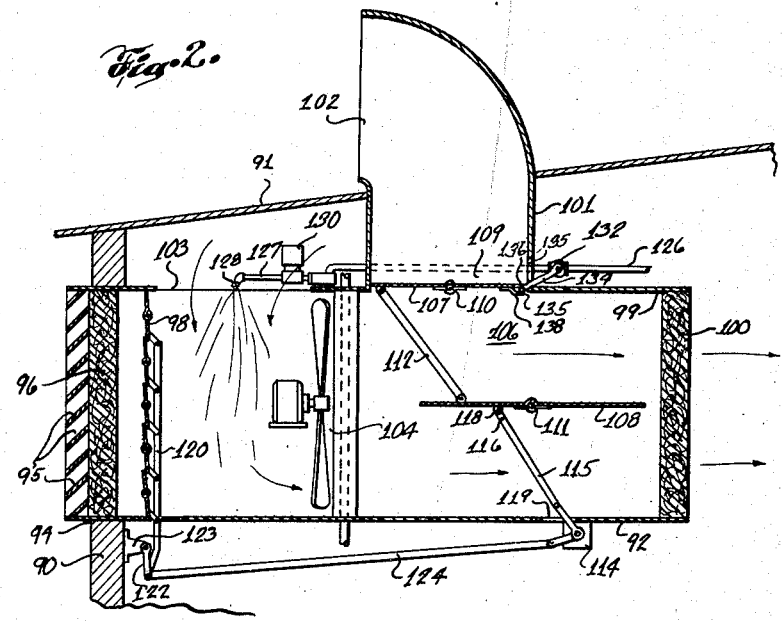
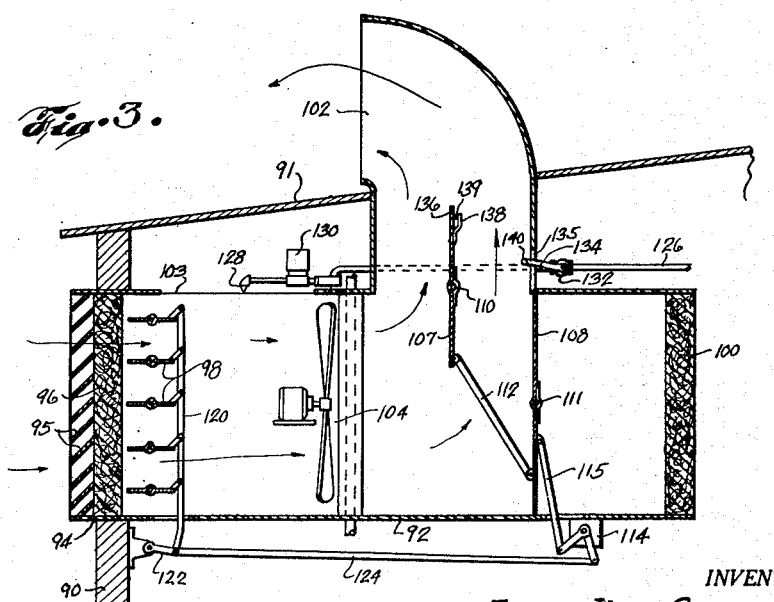

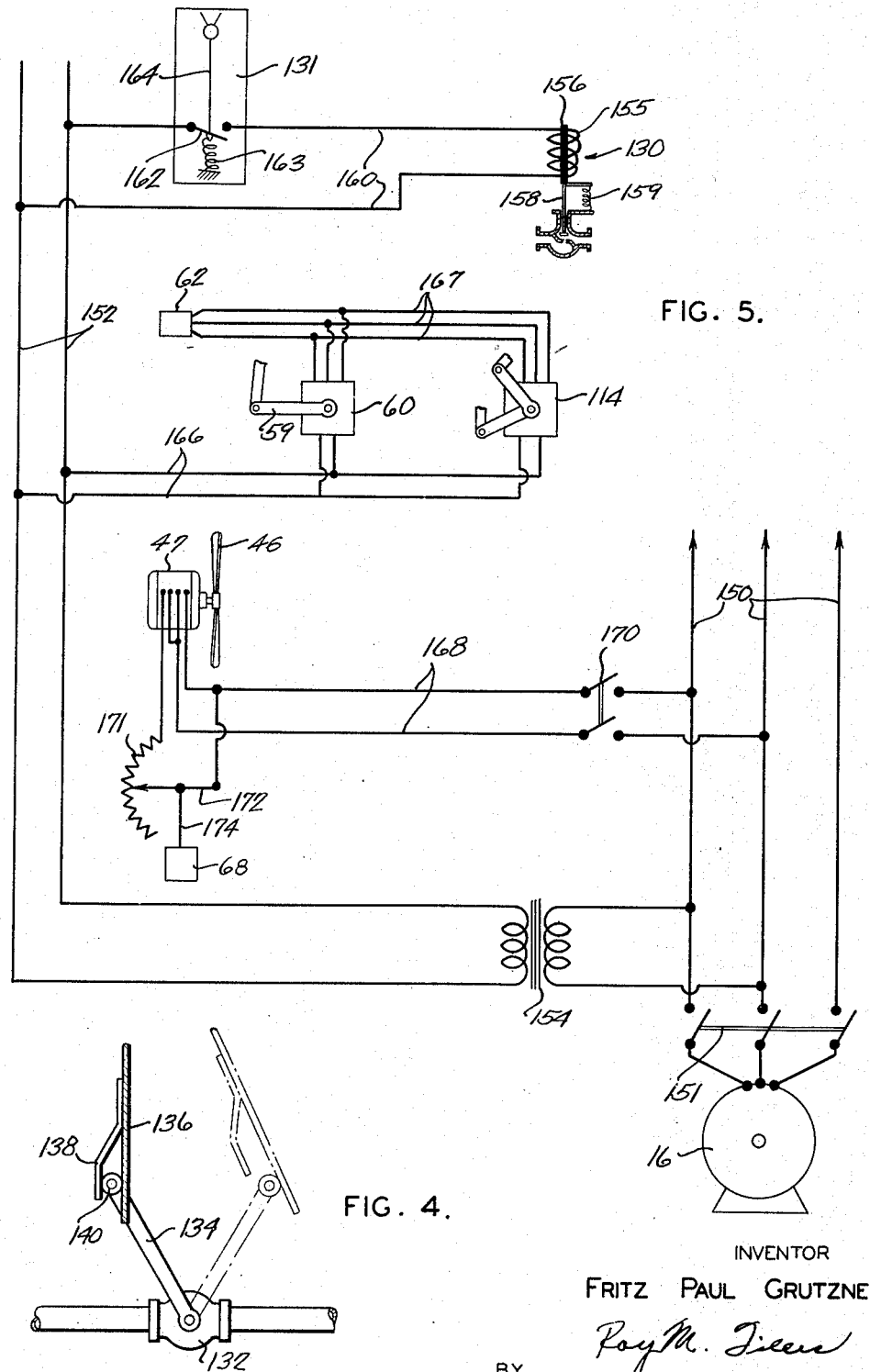

Patented Feb. 13, 1940

2,189,895

UNITED STATES PATENT OFFICE 2,189,895

HEATING AND VENTILATING SYSTEM

Fritz Paul Grutzner, Beloit, Wis., assignor to Fairbanks, Morse & Co., Chicago, Ill., a corporation of Illinois Application June 15, 1936, Serial No. 85,272

4 Claims. (Cl. 237—12.1)

This invention relates to improvements in heating and ventilating systems, and more particularly to an improved heating and ventilating system in combination with an internal combustion engine, wherein the engine serves as the source of both heat and power for the system.

As is well known, the function of the internal combustion engine is to transform thermal energy into mechanical energy, the mechanical energy thereby produced being utilized directly for power purposes, or for producing electrical energy, as by utilizing the engine to drive an electric generator. However, as a power producing agency, the internal combustion engine is notoriously inefficient, since less than half of the total thermal energy produced as a result of fuel combustion within the engine is transformed into mechanical energy available as such at the crankshaft. The greater portion of the thermal energy produced is normally lost in the form of heat in the exhaust, in the jacket cooling system and through mechanical friction and radiation. Moreover, as will be readily understood, the total thermal energy produced in an engine is proportionate to and varies with the power loading thereof. Thus, when the engine is operating at substantially its full load capacity, the total waste heat, being that heat lost in the exhaust gases, engine cooling system, friction of engine moving parts and radiation, will be considerably greater than when the engine is running under no load or under load less than full load. A substantial portion of this waste heat, particularly that lost in the engine cooling system and in the exhaust gases, may be recovered and utilized for heating purposes. Accordingly, the present invention contemplates an improved system for recovering the normally waste heat produced by an internal combustion engine while in operation, and applying such heat to the heating of buildings, automotive vehicles, aircraft, ships and the like.

Hence, it is an object of the present invention to provide an improved heating and ventilating system in conjunction with an internal combustion engine, wherein the waste heat produced by the engine during its operation, together with part of the power developed thereby, is utilized in the system. More specifically stated, the object is to provide a heating and ventilating system for buildings, ships, automotive vehicles, and the like, wherein the waste heat produced by an internal combustion engine in operation, is utilized as the heating medium for the heating apparatus of the system, and wherein the power developed by the engine is utilized for operating the ventilating and other apparatus of the system, and for general power purposes.

Another object is found in the provision in a system of the type described, of automatically controlled heat transfer apparatus for supplying heated air to an object or space to be heated, the apparatus being operable to proportion the delivery of heated air thereto according to the heat requirements of such space, and to vent to the atmosphere any remaining portion of the heated air not required for heating purposes.

A further object is to provide in a system of the type described, automatically controlled heat transfer apparatus for supplying heated air to an object or space to be heated, the delivery of heated air thereto by the apparatus being controlled by a suitable device of thermostatic type located in the space to be heated, and operable to regulate the apparatus in accordance with the heat requirements of the space, the control of heat delivery by the thermostat being effected independently of the amount of waste heat produced by the engine during its operation.

A still further object is to provide in a system of the type noted, automatically controlled heating and ventilating apparatus including a blower and a heat exchanger device or radiator, and air stream directing means, the apparatus functioning to create a positive flow of air through the radiator, by which the air is heated, and to deliver through the directing means, part or all of the heated air either to a space to be heated or to the outside atmosphere, the positive flow of air created by the blower also serving to effect a circulation of the air in and through the space for the ventilation thereof.

Yet another object is found in the provision in a system of the type described, of regulated heating and ventilating apparatus including a radiator and a blower, in which the blower serves to create a positive air stream which is directed through the radiator, to be heated thereby, the apparatus also including an automatically controlled humidifier assembly comprised of a water spray device located in the path of the air stream effected by the blower, whereby the water spray will be entrained in the air stream and evaporated to provide the desired degree of humidity in the air delivered to the space to be heated and ventilated.

A still further object is to provide in a power and heating system of the type described, heat transfer apparatus associated with the engine jacket cooling system, the apparatus serving to cool the jacket water and in doing so to heat air for delivery to an object or space to be heated, and automatic regulating means of thermostatic type, for controlling the rate of jacket water cooling by the heat transfer apparatus, such control being effected independently of the demand for heat by the object or space to be heated.

A still further object is found in the provision in a system of the type described, of heat transfer apparatus of the forced air circulation type for supplying heated air to an object or space to be heated, in which air to be heated is forced through the heat transfer apparatus and then through air delivery means by which the heated air is directed in varying proportion to the object or space, according to demand for heat therein, with the remainder of the heated air vented to the outside atmosphere or some other space. The apparatus is adapted to provide complete ventilation of the space, as by venting to atmosphere all the heated air passing through the transfer apparatus when no call for heat is made at the space to be heated, and for providing a partial heating and ventilation thereof by proportioning the division of heated air to the atmosphere and to the space to be heated in accordance with the degree of heat demand of the space, the demand being by preference registered upon a thermostatic device which controls the proportioning of the air flow.

From the foregoing objects it will appear that, generally stated, the present invention attains a combined power and heating and ventilating system employing an internal combustion engine as a source of power, and utilizing as sources of heat the exhaust and jacket heat of the engine, the arrangement preferably being such that a space is heated, ventilated and humidified, each under automatic control; further such that exhaust heat recovery and engine cooling action are both automatically controlled. The invention further attains full thermostatic control of engine cooling and space heating through thermostatic apparatus preferably acting independently for these purposes in a system utilizing the same heat transfer apparatus for both room heating and engine cooling.

The foregoing and numerous other objects and advantages will be found from the following description and from the drawings, in which:

Fig. 1 is a diagrammatic illustration of a preferred embodiment of the system incorporating features of the present invention, the illustration showing certain of the elements of the system in sectional elevation; Fig. 2 is an enlarged sectional elevation of the preferred form of heat transfer apparatus employed in the embodiment of Fig. 1, the section being taken along line 2—2 in Fig. 1 and showing the air flow directing elements of the apparatus in position to deliver heated air to the space to be heated; Fig. 3 is a sectional elevation similar to that of Fig. 2, but showing the air flow directing elements of the apparatus positioned for diverting all the heated air to the atmosphere; Fig. 4 is an enlarged detail elevation of a part of the heat transfer apparatus, showing an arrangement for automatically controlling an input valve to the humidifier device, and Fig. 5 illustrates in a diagrammatic manner, the circuit arrangement of the control means associated with the system of Figs. 1, 2 and 3.

While the system embodying the improvements of the present invention may be employed in combination with any suitable type of internal combustion engine, it is preferred to describe and illustrate the system as applied to an engine of Diesel type, since this type of engine is recognized as being an economical transformer of thermal energy into mechanical energy. Moreover, the system presently to be described is readily applicable to the heating and ventilating of residences and buildings generally, railway and automotive vehicles, ships, aircraft and the like.

Referring now by suitable characters of reference to Fig. 1 which illustrates, diagrammatically a preferred embodiment of the invention, the numeral 10 designates a building having a room or space 11 to be heated, ventilated and otherwise air-conditioned. It is to be understood, of course, that the room 11 may represent all or any part of the space or spaces to be heated and ventilated, such as one or any number of rooms. An internal combustion engine 12 preferably of water-cooled, Diesel type, is suitably arranged within the building 10 either within the room or space 11, or as in the present example, within an engine room 13 separated from the room 11 by the wall 14. The engine is mechanically coupled as at 15, to a suitable electric dynamo or generator 16, the generator serving to provide electric power for use in the building, and also power for operating certain of the apparatus included in the heating and ventilating system of the invention.

The engine is provided with the usual exhaust manifold 18 to which is connected an exhaust outlet conduit 19, the conduit being directed through a wall portion 20 of the engine room for venting the exhaust gases to the atmosphere. A two-way valve 22 which may be of any well known type suitable for the purpose, is located in a portion of the conduit 19, the valve serving selectively to by-pass all or any portion of the exhaust gases through a heat exchanger device 23, thence to the atmosphere through an exhaust vent 24. An operating lever 25 is provided for the valve, the lever being operated either manually or automatically in response to varying atmospheric conditions. The heat exchanger device is well known and may be of any suitable type readily available.

In the engine cylinder cooling system, water or other suitable cooling fluid is circulated through the cylinder jackets by a suitable pump 26, the outlet 27 of which is connected to the jacket inlet 28 as by the conduit 30. The jacket outlet 31 is connected by a conduit 32 to one end 34 of a coiled conduit 35 disposed within and comprising an element of the exhaust heat exchanger 23, the conduit 32 being provided with a control valve 36 for a purpose presently to appear. The opposite end 38 of coiled conduit 35 is connected to one end of a hot water distributing conduit or header 39, the conduit 39 being provided with a control valve 40, located adjacent the outlet end of the coiled conduit 35. The conduit 39 which extends into the space 11, has interposed therein, one or more space heating radiators 42, each of which forms an element of a unit heater later to be described in detail. The jacket water flowing in header 39 and through radiators 42, is returned to the inlet 43 of pump 26 through a return header 44. While the radiators 42 are here shown to be connected in series, it is to be understood that they may be related in parallel, each across the supply and return headers 39 and 44 respectively.

From the foregoing, it will be observed that the water flowing in the circulation system described is heated in its passage through the engine jackets and through the exhaust heat exchanger 23. As will be later described, the exhaust heat exchanger may be cut out of the water circuit so that the water may be heated only in the engine jackets, such provision being made as a means for reducing the heating capacity of the system when the maximum heat output thereof is not in demand.

A fan or blower 46 driven by an electric motor 47 is disposed adjacent each radiator 42, in a position to create a forced flow of air in heat-exchange contact therewith. Blower motor 47 may be supplied with current for its operation from the main generator 16, as illustrated in the circuit diagram of Fig. 5 to be hereinafter described. However, such circuit arrangement is disclosed diagrammatically in Fig. 1, wherein broken line 48 indicates a power supply cable leading from generator 16 through a control device 49. A branch cable 50 shown in broken lines, leads from supply cable 48 to each fan motor 47 through a speed control device 51. In the present example, two such radiator and blower units or assemblies are shown, although it is to be understood that any number thereof may be utilized, depending upon the requirements of any particular installation. Moreover, each radiator 42 and its blower 46 constitute certain of the important elements of the improved heat transfer apparatus or unit heater embodied in the system of this invention, two of which are illustrated in Fig. 1 in horizontal section, each being designated generally by the reference numeral 52. The complete structural and operative features of the unit will be later described in connection with the disclosures of Figs. 2 and 3.

Suitably arranged in a wall portion of the building is an outside ventilator 54 opening into the room or space 11, the ventilator including an air filter 55 of suitable type and movable air regulating dampers 56. The dampers 56 are by preference, coupled to a common control lever 58 which in turn is actuated by an arm 59 operated by a relay or electric motor 60, the motor being adapted to operate the dampers to full-open or full-closed position, or to any position therebetween. Suitable units of the type exemplified by the motor 60 are known in the art and available to the trade. Operation of the motor is by preference, automatically controlled by a room thermostat 62 suitably arranged within the space or room to be heated and ventilated, the thermostat being operable responsively to temperature variations occurring in the room or space 11. The electric circuit connections between motor 60, the electric power supply and thermostat 62 may be of any well known type suitable for attaining the desired ventilator control. Such a circuit is illustrated in Fig. 5 and will be hereinafter described. However, a diagrammatic showing thereof appears in Fig. 1, wherein a branch cable indicated in broken lines at 63, connects the motor 60 to power cable 48, while a branch cable 64 likewise in broken lines, connects the motor to a header cable 65 shown in broken lines, leading to the control thermostat 62.

A by-pass conduit 66 is shown connected between the jacket water outlet conduit 32 and the distributor conduit 39, the by-pass being provided with a suitable control valve 67. For the purpose heretofore discussed, the provision of the by-pass enables cutting out of the circulating system the heat exchanger apparatus 23, as by closing the valves 36 and 40 and opening valve 67. The water leaving the engine jackets then flows through by-pass 66 directly to header 39 and through the radiators 42, from whence the water is returned to the engine by the pump 26 for re-circulation in the manner described. Obviously, the water flow from the jacket may be proportioned, as desired, through both paths.

It is desirable in engine installations of the type described, to regulate the temperature of the cooling water entering the engine jacket so as to maintain the temperature of the water substantially constant, within limits, to avoid undue thermal stresses in the metallic structure of the engine. Since, as will be readily observed, the blower and radiator units 42—46 serve as the cooling agency for the engine jacket water, the degree or rate of heat extraction from the cooling water by these units may be suitably controlled for regulating the temperature of the water entering the engine jacket. This may be done by regulating the operation of each blower 46, through a speed control of its driving motor 52, in response to the temperature of the jacket water discharged through the jacket outlet 31. Accordingly, each blower motor 47 is of variable speed type, having its speed regulated by suitable, well known means heretofore designated at 51 which is under direct control of a thermostatic device 68 disposed in the outlet connection 32 of the engine water jacket. As illustrated in Fig. 1, the speed control devices 51 are indicated as being directly controlled by thermostat 68 through an operative connection of suitable type, shown in broken lines at 69. With this arrangement, variations of water temperature at the jacket outlet 31 will directly affect the thermostatic control 68 which, in turn, will effect a regulation of the speed of operation of the blower motors 47, hence of the blowers 51, to control the rate of heat extraction from the water passing through the radiators 42, thus enabling the maintenance of a substantially constant temperature of the cooling water entering the engine jackets. A suitable blower speed control system for this purpose is illustrated in Fig. 5, to be later described.

The description thus far of the system of Fig. 1 illustrates the application of an internal combustion engine to a heating and ventilating organization, wherein the waste heat produced by the engine is utilized to heat water which is circulated through one or more radiators suitably arranged within a space or spaces to be heated. The system of Fig. 1 is of the unit heater type, providing individually complete unit heaters, designated generally by the numeral 52, which may be advantageously arranged within the space to be heated so as to secure the maximum of heating efficiency. The structural details and arrangement of the elements of each unit heater will be hereinafter described in connection with the illustration thereof in Figs. 2 and 3.

A particular advantage attained by the unit heater type of heating system is its ready application to the heating of buildings or spaces which are remote from the engine installation. This feature will be apparent from an inspection of Fig. 1 as all that is required for remote application of the unit heaters is to extend the supply and return headers for the radiators of the unit heaters.

Referring now to Figs. 2 and 3 wherein is disclosed in diagrammatic manner, a preferred form of heat transfer apparatus or unit heater hereinbefore referred to in connection with the description of the system of Fig. 1. While the unit heaters may be located as desired, within the space to be heated and ventilated, these units are preferably disposed adjacent to and beneath the ceiling or roof portion of the room, and will be so described. Accordingly, in the drawings, 90 designates a wall portion of a building or other similar structure in which the presently improved system is arranged, while 91 designates a portion of the roof of the building. A section of conduit or other suitable form of enclosure structure 92 extends through the wall portion 90 and inwardly of the building in a substantially horizontal manner. The end 94 of the enclosure extending through the wall 90 is open to the atmosphere and has suitably arranged in the opening thereof, louvers 95, an air filter 96 and adjustable air damper elements 98. The opposite end 99 of the enclosure 92 is open to the interior of the building and is provided also with an air filter 100. The enclosure is provided further with a conduit portion 101 in communication with the interior of the enclosure and extending laterally or upwardly of the enclosure through the roof portion 91 in the manner shown, the conduit being open to the atmosphere as at 102. The enclosure 92 is also provided with an air inlet 103 through a wall portion of the member near the end portion 94 thereof, such inlet being in communication with the interior of the building. A radiator and blower unit 104, similar to the units 42—46 of Fig. 1, is disposed within the enclosure 92, the unit by preference, being located between the air inlet 103 and conduit 101, substantially as shown. Thus during operation of the blower, air may be drawn into the enclosure 92 through either or both of the inlets 103 and 94, and expelled therefrom through either or both of the outlets 99 and 102.

As a means for controlling and proportioning the delivery of air to the interior of the building through the enclosure end 99 and to atmosphere through the conduit 101, to care for changing heating and ventilating requirements of the room 11 (Fig. 1), a valve structure generally denoted at 106 is suitably arranged within the enclosure 92 on the discharge side of the blower. The valve structure is comprised of a pair of valve elements or dampers 107 and 108, the valve element 107 being disposed in the inlet zone or passage 109 of the vent conduit 101 communicating with the interior of the enclosure 92, while the valve element 108 is disposed within the enclosure 92 adjacent to and thus serving to control outlet end 99. Each of the valve elements 107 and 108 is pivotally supported intermediate its ends, as by pivot elements 110 and 111 respectively. The two valves are interconnected for concurrent or simultaneous operation by a link element 112 having its ends pivotally connected in a suitable manner to the valve elements. A valve actuating device or motor 114 which may be of any well known reversing type adapted for operation in response to the operation of a room thermostat, such as that shown at 62 in Fig. 1 is, by preference, secured to an external portion of the enclosure 92 and is operatively associated with valve element 108, as by the connecting linkage 115, one end 116 of which is pivotally connected to the valve 108, as at 118. A slot 119 of suitable extent is formed in the wall of the enclosure, through which the linkage 115 operates. The adjustable damper elements 98 are also adapted to be actuated by the device or motor 114, as through a bar 120 pivotally associated with and interconnecting the dampers 98, an arm 122 pivotally supported by a member 123 carried by the wall 90 and in turn pivotally connected to the bar 120 and to a motor actuated lever 124. Thus whenever the motor 114 is operated, it will effect a simultaneous actuation of both the valve elements 107 and 108, and the dampers 98. A suitable control circuit arrangement for motor 114 and the room thermostat 62 is shown in Fig. 5 and will be later described. Additionally, such control circuit is indicated broadly in Fig. 1, wherein electric power is supplied to each motor 114 by a branch cable 70 indicated in broken lines as leading from main 48, while a control branch 71, also shown in broken lines, leads from the thermostat cable 65 to motor 114. Also shown in Fig. 1 is a diagrammatically illustrated operating connection 72 between motor 114 and the damper structure 98, indicating direct control of the latter by motor 114. In practice of course, the connection 72 may correspond to the linkage 120—124 shown by Figs. 2 and 3.

An air humidifying system is associated with the blower and radiator unit 104 for supplying moisture to the air passing through the unit. A water conduit 126 supplying water from a suitable source (not shown) is connected to a pipe section 127 having a spray nozzle 128 on one end thereof, the nozzle being disposed in the path of air flow through the air inlet 103 of the enclosure 92. The water spray from nozzle 128 will be entrained in the air stream, directed through the blower and radiator unit. As a means for controlling the water spray, a solenoid or magnetically operated valve 130 is arranged in the pipe section 127, the valve being adapted for operation in response to a humidostat or other suitable humidity operated device disposed in the room or space to be supplied with humidified air. Such a humidostat is shown at 131 in Fig. 1. The operative circuit connection of the humidostat control to the valve 130 may be effected in any well known manner, a preferred circuit arrangement therefor being shown in Fig. 5 later to be described. However, there is indicated broadly in Fig. 1, such a control arrangement, wherein a cable 73 shown in broken lines, connects the humidostat 131 to the branch cable 50 leading from power cable 48, while a cable 74 also shown in broken lines, connects the humidostat to the valves 130. A second or auxiliary water control valve 132 is provided also, in the conduit 126, this valve having an operating arm 134 adapted to be actuated in response to pivotal movement of the air control valve 107. For this purpose, the arm 134 is extended through a suitable slot 135 in a portion of the conduit 101, into the path of movement of the end portion 136 of the valve element 107. The valve end 136 is provided with a tongue element 138 forming with the valve end a pocket, or forked seat 139 for the reception of an end portion 140 of the arm 134. The operative association of the valve 107 and arm 134 is such that when the valve 107 is disposed in a horizontal position to close the conduit 101 from its communication with the interior of the enclosure 92 through passage 109, the arm end 140 will be seated in the pocket 139, in which position of the arm 134 the water valve 132 controlled thereby will be open to maintain the flow of water to the spray nozzle 128. When the air valve 107 is operated to open the passage 109, the consequent movement of the air valve will actuate the arm 134 to close the water valve 132. In the return movement of the air valve to closed position, the valve end 136 will effect a reseating of the arm end 140 in the pocket 139 to again effect opening of the water valve 132. The details of the control association of the air valve 107 with the operating arm 134 of the auxiliary valve 132 are more clearly illustrated in Fig. 4, in which are shown two positions of the air valve 107 in its control actuation of the valve 132. The full line position of the several elements referred to shows the valve arm 134 in valve open position, while the dotted line position of the elements shows the air valve about to operate the arm to open position.

In the operation of the heat transfer unit presently described and illustrated in Figs. 2 and 3, the motor 114 is arranged for operation responsively to the functioning of the thermostat control 62 shown in Fig. 1, to position the air valves 107 and 108, say as shown in Fig. 2. In this instance, the air valve 107 is positioned to close the passage 109 of conduit 101, while air valve 108 is in full open position permitting the entire air stream created by the blower of unit 104 to flow through the enclosure outlet end 99 and filter 100, to the interior of the building. Also in this example, concurrently with the positioning of the air valves, the dampers 98 will be actuated to close the inlet end 94 of the enclosure 92, thus the inlet of air to the enclosure and blower will be effected entirely through the inlet 103. Hence air will be drawn from the interior of the building through the inlet 103, blower and radiator unit 104, and returned to the building space through the outlet 99. When hot water is being circulated through the radiator of the unit 104, the air stream will be heated by contact therewith in a well known manner. In the example under discussion, the air valve 107 in the position shown effects an opening of the water valve 132, thus permitting water to flow to the valve 130. Should the valve 130 be operated to an open or partly open position in response to operation of the humidostat 131, a spray of water will be delivered to the air stream, so as to provide the desired degree of humidity in the air delivered to the building space.

Fig. 3 illustrates the air valves 107 and 108 in position to vent to atmosphere the entire air stream created by the blower of unit 104. In this example, the air valve 108 is in full closed position so as to cut-off any forced flow of air into the building, while the air valve 107 is in open position to permit the air stream to flow to atmosphere, as through the vent conduit 101. Also, the damper elements 98 will be in full open position when the air valves are disposed as shown, so as to permit outside air to be drawn into the enclosure 92. With the air valves and dampers 98 in the positions described, air will be drawn from the interior of the building through the inlet 103 and from the outside through the enclosure end 94, and will flow through the blower unit 104 and duct 101 to atmosphere, thus creating a positive venting of inside air to the atmosphere. In this latter instance, the wall ventilator 54 shown in Fig. 1 may be in full-open position to admit fresh air to the interior of the space, thus to provide for a complete circulation of fresh air through the space to be ventilated.

The motor 114 for actuating the air valves 107 and 108 and the dampers 98, and the motor 60 operating the dampers 56 of ventilator 54 disposed in a wall of the building (Fig. 1), are correlated for synchronous operation in response to operation of the room thermostat 62, the means for accomplishing this end being well known in the art of thermostatic regulation, an example of which is shown in Fig. 5 later to be described. With such an arrangement, when the air valves 107 and 108 and dampers 98 are disposed in the positions illustrated in Fig. 2, the damper elements 56 (Fig. 1) will be closed to cut off air flow through the ventilator 54. Likewise, when the air valves are disposed as shown in Fig. 3, wherein the air stream heated by its passage through the radiator is vented to atmosphere, the dampers 56 of ventilator 54 will be in full open position to admit fresh air to the space to be ventilated.

The disclosures of Figs. 2 and 3 illustrate the opposite extreme positions of the air valves 107 and 108 and dampers 98. However, the valve and damper actuating motor 114, as in the case of the motor 60 above referred to, may be of any standard type available to the trade, and adapted to actuate the valves and dampers to any of a number of intermediate positions between the described extremes, in response to actuation of the thermostat 62.

From the foregoing, it will be observed that any degree of heating and ventilation of the space thus to be conditioned may be attained with the system of Fig. 1 including unit heaters of the general type shown in Figs. 2 and 3. Also it will be noted that the system provides for humidification of the air circulated in the space to be air-conditioned. The operation of the system is believed to be readily apparent from the foregoing description. However, for the sake of completeness, it is to be noted that in addition to providing for complete heating and ventilation under all atmospheric and seasonal conditions, the system provides a power plant which may be utilized to supply all or any part of the power requirements in the building or other place in which the system may be installed.

Referring now to Fig. 5 wherein is illustrated in a diagrammatic manner, a suitable circuit arrangement for the several control means associated with the space conditioning system as hereinbefore described, 16 represents the engine driven generator shown in Fig. 1, which generator may be used to supply current to the control circuits now to be described, in addition to furnishing electric power for other purposes. The generator is shown as of a three-phase alternating current type, supplying power to the mains 150, as controlled by a suitable circuit breaker or main power switch 151. A reduced voltage is supplied to the control circuit mains 152 through a suitable step-down transformer 154 connected to the generator mains 150.

Considering first the circuit of the humidostat-controlled water spray valve shown in Figs. 2 and 3 and designated by the numeral 130, this valve which as heretofore described, is preferably of an electromagnetically actuated type, includes an operating winding 155 and an armature 156 operatively connected to a valve stem 158. A suitable spring 159 serves to effect a closure of the valve when the winding 155 is not energized. Winding 155 is connected across the low voltage supply mains 152 by leads 160, and in circuit with one of the leads is the humidostat 131 heretofore described. The humidostat which may be of any well known type, comprises essentially a switch 162 normally urged to open position by a suitable spring 163, and a moisture-responsive element 164 operative to close the switch in response to predetermined low-humidity conditions in the space to be conditioned. Closure of the humidostat switch serves as heretofore described, to open the valve 130 through energization of its magnet winding 155, whereby water may be delivered through the valve to the spray device 128 (Figs. 2 and 3). When the desired degree of humidity is attained in the space wherein the humidostat is located, the humidostat spring 163 will operate to open the switch 162 and thereby to effect a deenergization of the valve winding 155, permitting the valve to close under the influence of its spring 159, and hence shutting off further supply of water to the spray 128.

Also supplied with operating current from the low voltage mains 152 are the ventilator and air proportioning valve actuating motors 60 and 114 hereinbefore described. These motors which may be of any well known, commercially available type, characterized by reversible rotation and operability of the rotary element to any position between predetermined limits of rotary movement, for the purposes heretofore described, are arranged in parallel circuit relation and connected to mains 152 by leads 166. As and for the purpose hereinbefore described, the motors are preferably operated simultaneously, under control of a single room thermostat device 62. The thermostat which may be of a well known potentiometer type, is connected in controlling relation to the motors by a control circuit 167, the motors as shown being in parallel in the control circuit. The function of these motors in response to the room thermostat control 62, to regulate the position of the ventilator and air proportioning valves is fully described in connection with the disclosure of Figs. 1, 2 and 3, hence such will not be repeated here.

Completing the disclosure of Fig. 5 is a suitable control circuit arrangement for the blower operating motor 47 of each heater unit 52. The blower 46 and its operating motor 47 are functionally associated with the unit heaters heretofore described, and as there noted, the speed of the blower is preferably made a function of the engine jacket water temperature, the purpose for this being fully described. In the control circuit arrangement, the blower motor 47 is supplied with current from the generator mains 150 through leads 168, controlled by a suitable switch 170. The field circuit of the motor includes a resistance element 171 provided with a movable contact arm 172 arranged to make contact at any point along the resistance, thus providing for the introduction of more or less resistance in the field circuit to vary the speed of the motor and hence that of the blower element 46. The contact position of arm 172 on resistance 171 is controlled by the thermostat 68 heretofore described as associated with the engine jacket water outlet 31 (Fig. 1) so as to be directly responsive to jacket water temperatures. The operating element of the thermostat (not shown) is connected to resistance arm 172 by an actuating element 174. The control arrangement is such that as the jacket water temperature tends to rise above a predetermined desired value for a given engine installation, thermostat 68 will act to vary the resistance in a direction to effect an increase in the speed of the blower motor, whereby to increase the rate of airflow past the jacket water cooling radiator 42 (Fig. 1) and thereby to effect a more rapid cooling of the jacket water to return the temperature thereof to the desired value. On decreasing jacket water temperatures as registered upon the thermostat 68, the reverse of the above described blower speed control function will occur. Thus by this arrangement, a substantially uniform jacket water temperature at the jacket inlet may be maintained, and further, it is to be noted as hereinbefore indicated, that such control of jacket water temperature is effected independently of heating demands of the space to be conditioned.

The present invention, as will be readily understood from the foregoing description of the preferred embodiment thereof, provides a combined power, heating, ventilating and humidifying system including an internal combustion engine, in which the engine serves as the source of both power and heat, the latter being found in the waste heat resulting from the operation of the engine. The complete system attains a fully automatic control of the heating, ventilating and humidifying features, the control thereof being responsive to temperature and humidity conditions existing in the space to be air-conditioned. Since the embodiment illustrated in the drawings is primarily in the nature of a preferred diagrammatic showing thereof, it is to be understood that the arrangement of the elements included in the system may be modified or otherwise altered to suit each installation of the system.

As before noted, the system is readily applicable for the purposes described, to buildings generally, automotive vehicles, aircraft, ships, etc., and in all of its applications, the system may be readily adapted to meet all or any part of the power, heating and ventilating requirements, as desired.

It is to be understood that the invention exemplified in the preferred embodiment illustrated and described hereinabove, is not to be limited solely to the particular embodiment shown, but that such may be altered or modified without affecting the spirit and scope of the invention, as defined in the accompanying claims.

I claim:

1. In a system of the type described, the combination of an internal combustion engine, a space to be air-conditioned, heating apparatus therefor, functionally associated with said engine so as to be heated thereby, ventilating means for said space, a blower for circulating air from said ventilating means and from the space, into contact with said heating apparatus to be heated thereby, means for conducting said air after contact with the heating apparatus, to said space and to atmosphere, means including a motor associated with said conducting means adapted for proportioning the flow of air to the space and to atmosphere, means operated by said motor for controlling said ventilating means and thermostatic means responsive to temperature conditions of said space, for controlling operation of said motor.

2. In a space-heating system of the type described, a space to be heated, an internal combustion engine of jacketed fluid-cooled type, a heat-exchange element and piping in circuit with the jacket space of said engine, said heat-exchange element being located within said space, an enclosure for said heat-exchange element, said enclosure having air inlet and outlet ports in communication with said space, and air inlet and outlet ports in communication with the atmosphere, a blower in said enclosure arranged for effecting a positive flow of air through said inlet ports, into heat-exchange relation to said heat-exchange element and thence through outlet ports, valve means controlling said atmosphere air inlet port, valve means controlling said outlet ports, and valve operating means common to said valve means, actuated in response to temperature changes in said space, for controlling said valve means in a manner to regulate the flow of air through said atmosphere inlet port and to direct the flow of air either to the atmosphere or to said space, or to proportion the air flow to the atmosphere and said space.

3. In a heating and humidifying system of the type described, a space to be so conditioned, an internal combustion engine of jacketed fluid-cooled type, a fluid cooling radiator and piping in circuit with the jacket space of the engine, a blower adjacent said radiator, for effecting a positive flow of air into heat-exchange relation to said radiator, an air duct enclosing said blower and radiator, said duct having an air inlet, an outlet open to the atmosphere and a second outlet open to said space, valve mechanism in said air duct, in controlling relation to said outlets, automatic means for operating said valve mechanism in a manner to proportion the air flow through said outlets in accordance with heating requirements of said space, liquid-spray means adjacent said air duct inlet, provided for admitting moisture to the air entering said inlet, said spray means including a supply connection, a control valve in said connection, operating means for said valve, responsive to the moisture content of the air in said space, a second control valve in said connection, and operating means therefor, actuated by said air control valve mechanism.

4. In a system of the type described, the combination of an internal combustion engine of jacket-cooled type, a fluid circulating jacket cooling system functionally associated with the engine jacket, said cooling system including a heat-exchanger, a space to be air-conditioned, ventilating means for said space, a variable speed blower for circulating air from said ventilating means and from the space, into contact with said heat exchanger to be heated thereby, and thus to cool the engine jacket fluid circulated through said heat exchanger, means for conducting said air after contact with the heat exchanger, to said space and to atmosphere, means including a motor associated with said conducting means adapted for proportioning the flow of air to the space and to atmosphere, means operated by said motor for controlling said ventilating means, thermostatic means responsive to temperature conditions of said space, for controlling operation of said motor, and thermostatically operated means in control of said blower, responsive to the temperature of the fluid circulated in said engine jacket, for controlling the speed of said blower.

FRITZ PAUL GRUTZNER.